US008645511B2

(12) United States Patent
Liu et al.

(10) Patent No.: US 8,645,511 B2
(45) Date of Patent: Feb. 4, 2014

(54) PRE-CONFIGURATION OF A CLOUD-BASED COMPUTER

(75) Inventors: Kan Liu, Mountain View, CA (US); John Nicholas Jitkoff, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/904,154

(22) Filed: Oct. 13, 2010

(65) Prior Publication Data

US 2011/0093941 A1   Apr. 21, 2011

Related U.S. Application Data

(60) Provisional application No. 61/360,318, filed on Jun. 30, 2010, provisional application No. 61/251,292, filed on Oct. 13, 2009.

(51) Int. Cl.
    *H04L 29/06* (2006.01)
(52) U.S. Cl.
    USPC ............................. 709/222; 709/221; 726/7
(58) Field of Classification Search
    USPC ...................................... 726/7; 709/222, 221
    See application file for complete search history.

(56) References Cited

U.S. PATENT DOCUMENTS

| 6,178,443 | B1 * | 1/2001 | Lin ............................... 709/208 |
| 6,735,691 | B1 * | 5/2004 | Capps et al. ...................... 713/1 |
| 6,963,908 | B1 * | 11/2005 | Lynch et al. ................... 709/220 |
| 7,587,473 | B2 | 9/2009 | Benco et al. |
| 8,032,556 | B1 * | 10/2011 | Cook et al. .................... 707/783 |
| 8,239,662 | B1 | 8/2012 | Nelson |
| 8,370,912 | B2 * | 2/2013 | Turnbull et al. .................. 726/7 |
| 2001/0014839 | A1 | 8/2001 | Belanger et al. |
| 2003/0061610 | A1 * | 3/2003 | Errico ............... 725/46 |
| 2004/0001088 | A1 * | 1/2004 | Stancil et al. ................. 345/748 |
| 2004/0073787 | A1 * | 4/2004 | Ban et al. ...................... 713/159 |
| 2004/0128203 | A1 * | 7/2004 | Pierre et al. ..................... 705/26 |
| 2005/0060432 | A1 * | 3/2005 | Husain et al. ................. 709/246 |
| 2005/0240763 | A9 * | 10/2005 | Bhat et al. ..................... 713/169 |
| 2006/0031407 | A1 | 2/2006 | Dispensa et al. |
| 2006/0041933 | A1 | 2/2006 | Yakov et al. |
| 2006/0161662 | A1 * | 7/2006 | Ng et al. ....................... 709/227 |

(Continued)

FOREIGN PATENT DOCUMENTS

WO   2011046939 A1   4/2011

OTHER PUBLICATIONS

"Cloud Computing Security—Making Virtual Machines Cloud-Ready", Trend Micro, Incorporated, Trend Micro White Paper, May 2010, 12 pages.

(Continued)

*Primary Examiner* — Jung Kim
*Assistant Examiner* — Theodore Parsons
(74) *Attorney, Agent, or Firm* — Brake Hughes Bellermann LLP

(57) ABSTRACT

A method may include receiving by a current computer a customization application, the customization application including a control panel to establish user preferences for a user account of the cloud-based service and/or system settings for the second computer; receiving by the current computer an input to the customization application to establish one or more user preferences for the user account and/or one or more system settings for the second computer; and transmitting from the current computer to a server associated with the cloud-based service the one or more user preferences and a username for the user account and/or the system settings for the second computer.

17 Claims, 8 Drawing Sheets

(56) References Cited

U.S. PATENT DOCUMENTS

| | | | |
|---|---|---|---|
| 2006/0230081 A1* | 10/2006 | Craswell et al. | 707/204 |
| 2007/0093243 A1* | 4/2007 | Kapadekar et al. | 455/419 |
| 2007/0208834 A1* | 9/2007 | Nanamura et al. | 709/220 |
| 2008/0114830 A1* | 5/2008 | Welingkar et al. | 709/203 |
| 2008/0313447 A1* | 12/2008 | Gillett et al. | 713/1 |
| 2009/0006640 A1* | 1/2009 | Brouwer et al. | 709/231 |
| 2009/0055464 A1* | 2/2009 | Multer et al. | 709/201 |
| 2009/0063660 A1* | 3/2009 | Fleischman et al. | 709/219 |
| 2009/0088142 A1* | 4/2009 | Baribault et al. | 455/418 |
| 2009/0106110 A1* | 4/2009 | Stannard et al. | 705/14 |
| 2009/0106266 A1* | 4/2009 | Donatelli et al. | 707/10 |
| 2009/0144341 A1* | 6/2009 | Hauck et al. | 707/202 |
| 2009/0249439 A1* | 10/2009 | Olden et al. | 726/1 |
| 2010/0005195 A1* | 1/2010 | Mendez et al. | 709/248 |
| 2010/0005452 A1* | 1/2010 | Anson et al. | 717/121 |
| 2010/0210240 A1* | 8/2010 | Mahaffey et al. | 455/411 |
| 2010/0228836 A1* | 9/2010 | Lehtovirta et al. | 709/220 |
| 2010/0306352 A1* | 12/2010 | Pritikin et al. | 709/221 |
| 2010/0311391 A1* | 12/2010 | Siu et al. | 455/411 |
| 2010/0319053 A1* | 12/2010 | Gharabally | 726/4 |
| 2011/0023100 A1* | 1/2011 | Anderson | 726/6 |
| 2011/0099612 A1* | 4/2011 | Lee et al. | 726/6 |
| 2011/0112926 A1* | 5/2011 | Kerr et al. | 705/26.5 |
| 2011/0119594 A1 | 5/2011 | Tsao | |
| 2011/0195700 A1* | 8/2011 | Kukuchka et al. | 455/422.1 |
| 2011/0202935 A1 | 8/2011 | Malmer et al. | |
| 2011/0252071 A1 | 10/2011 | Cidon | |
| 2011/0257958 A1 | 10/2011 | Kildevaeld | |
| 2011/0302630 A1 | 12/2011 | Nair et al. | |
| 2011/0306326 A1 | 12/2011 | Reed et al. | |

OTHER PUBLICATIONS

Chappell, "Introducing Windows Azure", David Chappell & Associates, Oct. 2010, 26 pages.
Chappell, "Introducing The Azure Services Platform", David Chappell & Associates, Oct. 2008, 31 pages.
Chappell, "Cloud Platforms—An Enterprise-Oriented Overview", David Chappell & Associates, Version 0.3, Jul. 16, 2008, 13 pages.
"Crypt (Unix)", From Wikipedia, the free encyclopedia, Sep. 16, 2009, 5 pages.
"Login Authentication Using Active Directory", VMWare Technical Note, ESX Server 2.1, Jan. 2006, 7 pages.
"MD5", From Wikipedia, the free encyclopedia, Oct. 8, 2009, 7 pages.
Neuman, et al, "The Kerberos Network Authentication Service (V5)", Network Working Group, Jul. 1, 2005, 138 pages.
PCT Search Report for PCT Application No. PCT/US2010/052333, mailed Feb. 9, 2011, 12 pages.
Raeburn, "Encryption and Checksum Specifications for Kerberos 5", Network Working Group, Feb. 2005, 51 pages.
Non-Final Office Action for U.S. Appl. No. 13/246,859, mailed Nov. 23, 2011, 37 pages.
Non-Final Office Action Response for U.S. Appl. No. 13/246,859, filed Feb. 22, 2012, 18 pages.
Final Office Action for U.S. Appl. No. 13/246,859, mailed May 15, 2012, 40 pages.
Non-Final Office Action for U.S. Appl. No. 13/246,859, mailed Dec. 21, 2012, 60 pages.

* cited by examiner

PRE-CONFIGURATION OF A CLOUD-BASED COMPUTER

CROSS-REFERENCE TO RELATED APPLICATIONS

This application claims priority to U.S. Provisional Application Ser. No. 61/251,292, filed on Oct. 13, 2009, entitled "Account and Boot Management In A Cloud Computing Platform," and U.S. Provisional Application Ser. No. 61/360,318, filed on Jun. 30, 2010, entitled "Pre-Configuration of a Cloud-Based Computer", both of which hereby incorporated by reference in their entirety.

TECHNICAL FIELD

This document relates to systems, architecture and functionality of a cloud-based computer.

BACKGROUND

With the creation of the world-wide-web and high speed computer networks, the paradigm for personal computer usage has dramatically shifted. In the past, users would primarily use their personal computers to run programs, and store and manipulate data that was located on their local hard-drive. Today, more and more users are storing more and more data on remote data servers. For example, many users today store their personal email and contact information, and even other information on a remote web server.

SUMMARY

According to an example embodiment, a method is provided for pre-customizing a first computer for a user. The method may include receiving by a second computer a customization application to establish user preferences for a user account of a cloud-based service and to establish system preferences for the first computer; receiving by the second computer an input to the customization application to establish one or more user preferences for the user account and one or more system settings for the first computer; and transmitting from the second computer to a server the one or more user preferences, one or more system settings, a username for the user account, and a computer ID that identifies the first computer.

According to another example embodiment, a method may be provided for pre-customizing a first computer for a user. The method may include transmitting from a server to a second computer a customization application to establish one or more user preferences for a user account of a cloud-based service and one or more system settings for the first computer; and receiving by the server from the second computer the one or more user preferences, the one or more system settings and a username for the user account.

According to another example embodiment, a computer program product is provided that is tangibly embodied on a computer-readable storage medium having executable-instructions stored thereon, the instructions being executable to cause a second computer to: receive by the second computer a customization application to establish user preferences for a user account of a cloud-based service and to establish system preferences for a first computer; receive by the second computer an input to the customization application to establish one or more user preferences for the user account and one or more system settings for the first computer; and transmit from the second computer to a server the one or more user preferences, one or more system settings, a username for the user account, and a computer ID that identifies the first computer.

According to another example embodiment, a computer program product is provided that is tangibly embodied on a computer-readable storage medium having executable-instructions stored thereon, the instructions being executable to cause a server to: transmit from the server to a second computer a customization application to establish one or more user preferences for a user account of a cloud-based service and one or more system settings for a first computer; receive by the server from the second computer the one or more user preferences, the one or more system settings and a username for the user account; store the received user preferences and system settings; receive, from the first computer, a log-on request including the username for the user account; and transmit the one or more user preferences and the one or more system settings to the first computer.

According to another example embodiment, a server may be provided that is configured to assist in pre-customizing a first computer. The server may include at least one processor, at least one memory including computer program code, the at least one memory and the computer program code configured to, with the at least one processor cause the server to: perform the following prior to a first log-on to a cloud-based service by a user via the first computer: transmit from the server to the second computer a customization application to establish one or more user preferences for a user account of a cloud-based service and one or more system settings for the first computer; and receive by the server from the second computer the one or more user preferences, the one or more system settings, a computer ID that identifies the first computer, and a username for the user account.

According to an example embodiment, a second computer is provided that may be configured to assist in pre-customizing a first computer for a user. The second computer may include: at least one processor, and at least one memory including computer program code, the at least one memory and the computer program code configured to, with the at least one processor cause the second computer to: receive by the second computer a customization application to establish user preferences for a user account of a cloud-based service and to establish system preferences for the first computer; receive by the second computer an input to the customization application to establish one or more user preferences for the user account and one or more system settings for the first computer; and transmit from the second computer to a server the one or more user preferences, one or more system settings, a username for the user account, and a computer ID that identifies the first computer.

According to an example embodiment, a method may be provided for pre-customizing a first computer for a user. The method may include: transmitting a request to a server to deliver a customization application; receiving the customization application from the server and running it on a second computer, wherein the customization application is configured to: identify a file on the second computer to be made available to the user when the user logs onto a cloud-based service using the first computer; and transmit information to the server to make the identified user file available to the user on the first computer when the user logs onto the cloud-based service using the first computer.

According to an example embodiment, a method may be provided for pre-customizing a first computer for a user. The method may include: transmitting from a server to a user on a second computer a customization application, wherein the customization application is configured to identify a user file on the second computer to be made available to the user when the user first logs onto a cloud-based service via the first computer, and to compute a checksum for the identified user file; receiving a name and checksum for an identified user file from the second computer; determining whether the identified user file is stored on the server by searching a database for a record that relates the received checksum to a file stored on the server; sending a request to the second computer to upload the identified user file to the server when no record is found in the database that relates the received checksum to a file stored on the server; receiving the identified user file from the second computer and storing the identified user file on the server; and storing the name, received checksum and information to locate the identified user file on the server in a database record that relates the user to the name, received checksum and information to locate the identified user file on the server.

According to another example embodiment, an apparatus may include at least one processor and at least one memory including computer program code, the at least one memory and the computer program code configured to, with the at least one processor cause a server to: transmit from the server to a user on a second computer a customization application, wherein the customization application is configured to identify a user file on the second computer to be made available to the user when the user first logs onto a cloud-based service via the first computer, and to compute a checksum for the identified user file; receive a name and checksum for an identified user file from the second computer; determine whether the identified user file is stored on the server by searching a database for a record that relates the received checksum to a file stored on the server; send a request to the second computer to upload the identified user file to the server when no record is found in the database that relates the received checksum to a file stored on the server; receive the identified user file from the second computer and storing the identified user file on the server; and store the name, received checksum and information to locate the identified user file on the server in a database record that relates the user to the name, received checksum and information to locate the identified user file on the server.

According to an example embodiment, a computer program product may be provided that is tangibly embodied on a computer-readable storage medium having executable-instructions stored thereon, the instructions being executable to cause a server to: transmit from the server to a user on a second computer a customization application, wherein the customization application is configured to identify a user file on the second computer to be made available to the user when the user first logs onto a cloud-based service via the first computer, and to compute a checksum for the identified user file; receive a name and checksum for an identified user file from the second computer; determine whether the identified user file is stored on the server by searching a database for a record that relates the received checksum to a file stored on the server; send a request to the second computer to upload the identified user file to the server when no record is found in the database that relates the received checksum to a file stored on the server; receive the identified user file from the second computer and storing the identified user file on the server; and store the name, received checksum and information to locate the identified user file on the server in a database record that relates the user to the name, received checksum and information to locate the identified user file on the server.

DESCRIPTION OF DRAWINGS

Like reference symbols in the various drawings indicate like elements.

DETAILED DESCRIPTION

Figure 1:
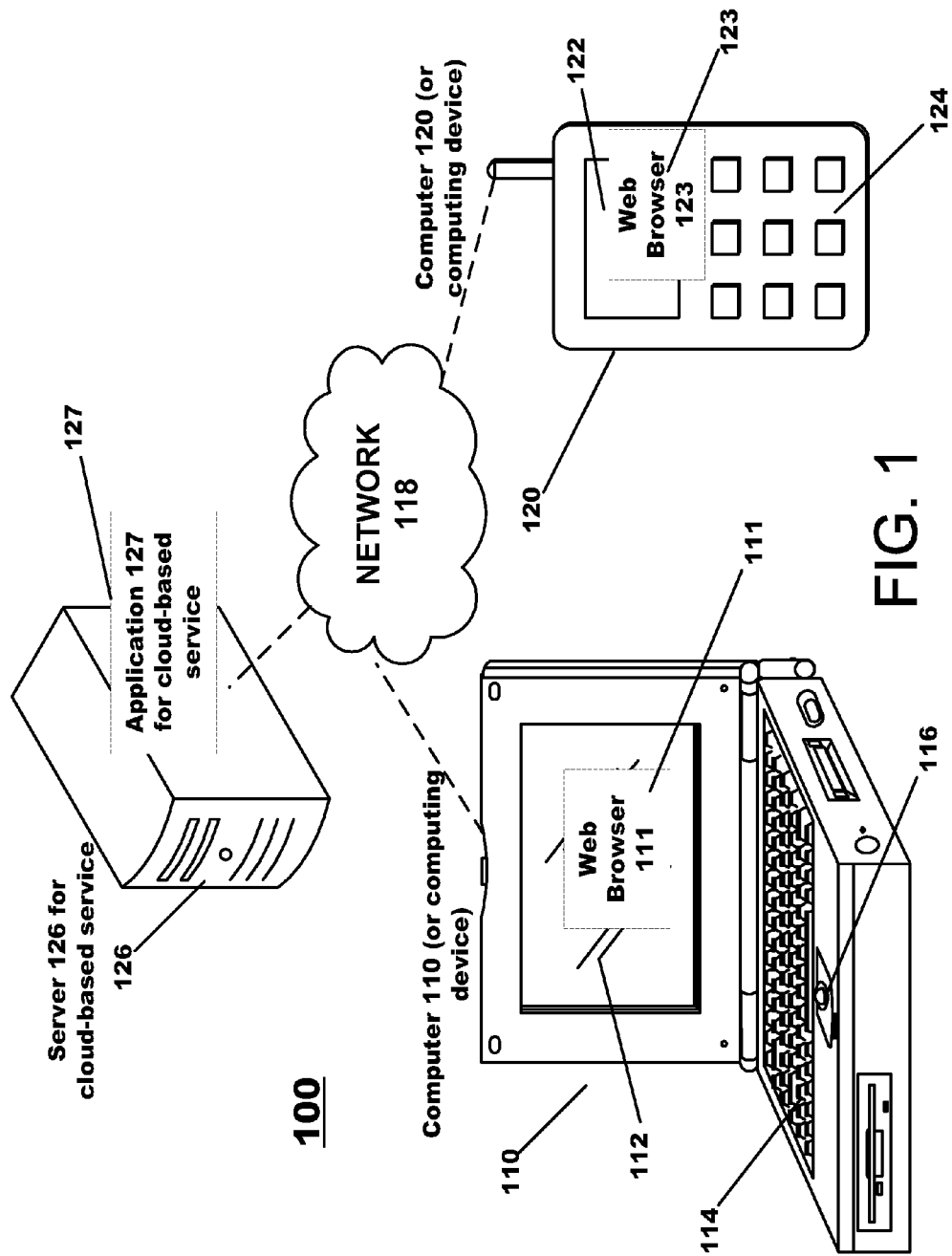
FIG. 1 is a block diagram of a system according to an example embodiment.

FIG. 1 is a block diagram of a system according to an example embodiment. System 100 may include a variety of computing devices connected via a network 118 to a server 126. Network 118 may be the Internet, a Local Area Network (LAN), a wireless network (such as a wireless LAN or WLAN), or other network, or a combination of networks. System 100 may include a server 126, and one or more computing devices, such as a computing device 110, and a mobile computing device 120. System 100 may include other devices, as these are merely some examples.

Computers 110 and 120 may each be any type of computer or computing device, such as a desktop computer, laptop computer, netbook, tablet computer, mobile computing device (such as a cell phone, PDA or personal digital assistant or other mobile or handheld or wireless computing device), or any other computer/computing device. Computer 110 may include a display 112, and a keyboard 114, and a pointing device 116 (such as a track ball, mouse, touch pad or other pointing device). Keyboard 114 may be any type of keyboard, such as a standard keyboard, or a touchscreen (or touch-sensitive display), as examples. In the case of a touchscreen display, the keyboard may integrated on the display.

Similarly, computer 120 may include a display 122, a keypad 124, and may include other input/output devices (not shown), such as a pointing device. Display 122 may be any type of display, such as a touchscreen, for example. Although not shown in FIG. 1, each of computers 110 and 120 may include memory to store data and software/computer instructions, a processor for executing software/computer instructions and providing overall control to the computer. Computers 110 and 120 may each include an operating system (OS) stored in memory and executed at startup, for example. Computer 110 may execute or run a web browser 111, and computer 120 may execute or run a web browser 123, for example.

According to an example embodiment, server 126 (which may include a processor and memory) may run one or more applications, such as application 127 to provide a cloud-based service (or a cloud-based computing service) where server 126 (and/or other servers associated with the cloud-based service) may provide resources, such as software, data, media (e.g., video, audio files) and other information, and management of such resources, to computers (or computing devices) via the Internet or other network, for example.

According to an example embodiment, computing resources such as application programs and file storage may be remotely provided by the cloud-based service (e.g., by cloud-based server 126) to a computer over the Internet, typically through a web browser running on the computer. For example, a computer (e.g., 110, 120) may include a web browser (e.g., 111 or 123) running applications (e.g., Java applets or other applications), which may include application programming interfaces ("API's") to more sophisticated applications (such as application 127) running on remote servers that provide the cloud-based service (such as server 126), as an example embodiment.

In an example embodiment, through a web browser 111 or 123, the user can use a computer (e.g., either computer 110 or 120) to log on to the cloud-based service (e.g., by the web browser communicating with server 126 of the cloud-based service). After logging-on to the cloud-based service, the user may create, edit, save and delete files on the remote server (e.g., server 126), and may establish (set up) or change/edit various options, such as user preferences and/or system settings, and/or may receive or download software (e.g., operating system or other software) or software updates, various data files or media files, the user preferences and/or system settings, and other information previously stored on the cloud-based service (e.g., server 126), via the remote application program 127 running on the cloud-based server 126.

In an example embodiment, each user may have more than one computer, and different system settings may be used for each computer. For example, a user may have a first computer for a first office location, a second computer for a second office location (each having specific attributes, and/or local printer settings for the specific location or office, etc.). The user may also have a laptop and a cell phone. Each of these may have a set of system settings associated with this user.

According to an example embodiment, a computer 110 or 120 (which may be referred to as a cloud-optimized computer platform, or a cloud-based computer, or a computer configured as a cloud-based computer) may be configured to run a lightweight, web-based operating system. The operating system, which can be downloadable and updatable from the cloud-based service (e.g., from cloud-based server 126 or other server associated with the cloud-based service) via the web, can start up the computer, launch a web-browser, and get a user onto the web. The computer, once logged on (or logged in) to the cloud-based service, may, for example, receive or support web-based user applications, e.g., that may be run through the web-browser, and allow users of the computer to store and access data, files and multimedia materials, and access software or applications on remote servers located within the cloud-based service (e.g., within a network cloud).

An example embodiment will now be described for logging onto a computer used for cloud-based computing/service or logging onto a cloud-based service. Upon booting (or running the operating system at startup), the computer 110 or 120 may prompt the user to enter information to authenticate the user and receive the user authentication information. In one implementation, the authentication information may include a username and password, and the computer may store a list of authentic usernames and passwords in a local database. The computer verifies the user's authenticity by locating the received username in the database and verifying that the received password is identical to the password that is associated with the received username in the database. To provide more security, one or more of the username and password can be stored in the database as a cryptographic hash. For example, the username can be stored as plaintext, while the password can be stored as a weak cryptographic hash.

In an example embodiment, if the computer fails to authenticate the user (e.g., by failing to find the username in the database, or by finding a difference between the hash of the password received from the user and the hashed password stored in the database), the computer denies the user access, and prompts the user to reenter the authentication information. In some implementations, the computer may limit the number of login attempts, and may prevent a user from accessing the computer after a given number of failed login attempts. In other implementations, the computer may grant a user limited access rights even after the user has failed to authenticate himself or herself. Such limited access rights can be, for example, only the right to browse information on the World Wide Web, but not access to the cloud-based service, for example.

In one implementation, the computer configured for cloud-based service, e.g., computer 110 or 120, may create and maintain the database of usernames and passwords, which may be hashed, on a local hard drive. In an alternative implementation, the computer 110 or 120 may create, upload and/or maintain the database of usernames and passwords on a remote cloud-based server, e.g., server 126 or other server associated with the cloud-based service. In the latter implementation, the computer may launch a web-based application to communicate the received username and password, or hashed values of the received username and password, to the cloud-based server 126. The web-based application (running on the computer) may also communicate a unique ID or a computer ID to the server 126, e.g., to identify the computer that is logging on to the cloud-based service. The cloud-based server 126 may then authenticate the information, e.g., as described above, and may return an authentication decision back to the browser (e.g., 111 or 123) through the web-based application. The computer 110 or 120 may then authorize or grant the user access to the cloud-based service based on the authentication decision made by the cloud-based server 126. Based on the decision by server 126 to grant the user access to the cloud-based service, the user of computer 110 or 120 may then access (e.g., via web browser 111 or 123) data, files, software application, media, etc., from the cloud-based service via one or more remote servers associated with the cloud-based service.

In an example embodiment of a computer optimized for cloud-based computing, e.g., computers 110 or 120, a main application run by the computer may be the web browser. In one implementation, the operating system may automatically launch a web browser upon authenticating a user and granting the user access to cloud-based service. The operating system may also grant the web browser access to system-level resources that are usually reserved for system-level applications. Such resources may include, for example, account and user access rights, power management rights, display setting and management rights, network setting and preference rights, media access rights, sound setting and management rights, keyboard and mouse setting rights, printer setup and install rights, and rights to update and modify the operating system. The user can also use the launched web browser to run web-based applications from a plurality of web servers via the cloud-based service. When a web-based application needs to alter a system setting for a cloud-based computer, it can be granted or denied the right to do so by the user or by the web browser.

In one implementation, a computer optimized for cloud-based computing (or a cloud-based computer which may log in to a cloud-based service) e.g., computer 110 or 120, may provide or display a user interface such as a control panel to allow a user to adjust user preferences and/or system settings, for example, or other options. The control panel may be provided, e.g., as a web-based application. This control panel (or other user interface) may be stored locally on computer 110 or 120 and then displayed, or may be downloaded to computer 110/120 from cloud-based server 126 and displayed to the user. A user may input one or more user preferences and/or system settings via the control panel, which may then be uploaded and stored on cloud-based server 126, for example.

Figure 2A:
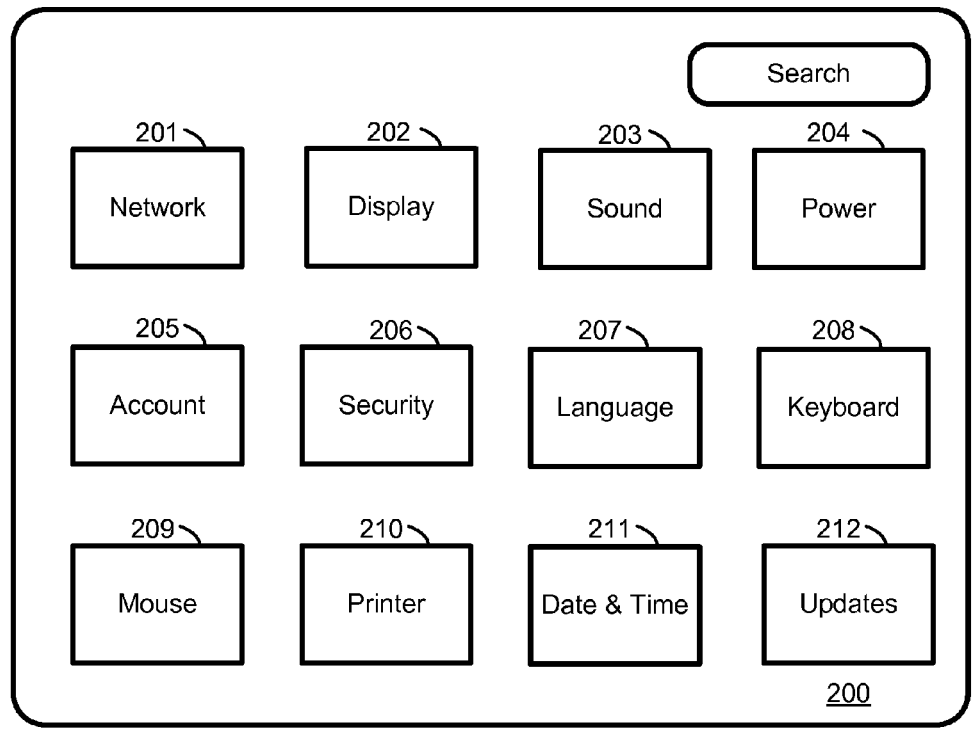
FIG. 2A is a schematic diagram of a control panel 200 (or example user interface) that can be used to set system settings and/or user preferences for a cloud-based service.

FIG. 2A is a schematic diagram of an example control panel 200 (or example user interface) that can be used to set system settings and user preferences for a cloud-based service (or for a computer for a cloud-based computing service).

According to an example embodiment, system settings may refer to settings that are specific to a particular computer, regardless of who (or what user) is using that computer, or regardless of what user is logging on to the cloud-based service using that computer. Thus, while different users (for different user accounts) may use a computer to log-in (or log-on) to the cloud-based service, the system settings may be specific to such computer. System settings may include one or more settings that may be set or fixed for a computer (system settings may be associated with a computer/computer ID). System settings may include settings such as, for example, network connections or preference (e.g., order of network connections), printer preferences, user account and access rights, display settings, mouse (or pointing device) settings, etc. These are merely some examples of settings or items that may be provided as system settings (e.g., settings that may be computer specific, or associated with a specific computer ID). In an example embodiment, system settings may only be applied to a computer (and/or changed/edited) by the owner of the computer.

By contrast, according to an example embodiment, user preferences may be settings that are specific to a particular user account (or user), regardless of what computer the user uses to log-in to the cloud-based service. User preferences may include, for example, such things as keyboard and mouse settings, favorite applications (e.g., to be made available to the user) and favorite websites (e.g., web browser bookmarks), account usernames and passwords (e.g., password for an Email account), music playlists, language preferences, screensaver and/or desktop background image(s), and the like. For example, user preferences may include an email account username/password (e.g., so that the user may be automatically logged in to such email account upon log-on to the cloud-based service), browser favorites (bookmarks) (e.g., so that such favorites may be automatically loaded into one or more preferred web browsers made available to the user or downloaded to the computer after then user log-on to the cloud-based service), and a desktop or background image (e.g., a family photo that is downloaded from the cloud-based service after log-on to such service, and then received by the computer and displayed as a desktop background image).

These are merely some examples of user preferences and system settings. However, various settings or preferences may be provided as either a system setting or a user preference. In one example embodiment, a user may also be able to select an item or option and then map or assign the item/option to be either a user preference (associated with a user account) or a system setting (associated with a specific computer or computer ID/unique ID). This may provide an additional degree of flexibility or configurability where a user may be able to associate certain items or options with either the user account or a specific computer.

In another example embodiment, default settings may be initially set by the cloud-based service, where according to the default settings, a first set of items/options may be assigned or mapped to user preferences (associated with a specific username or user account), while a second set of items may be assigned or mapped to system settings (associated with a specific computer ID). In an example embodiment, using a control panel or other user interface, a user may then be able to re-assign one or more system settings as a user preference, and may be able to assign one or more user preferences as system settings, for example.

Thus, for example, the user may log-in to the cloud-based service (e.g., providing username, password and a computer ID). The cloud-based service (e.g., cloud-based server 126) may retrieve from a database of the cloud-based server 126 the system settings for the computer (previously uploaded to the cloud-based service for the computer ID) based on the received computer ID and the user preferences (e.g., based on the username for the user account). The user preferences and system settings may then be downloaded by the computer from the cloud-based service, and then applied, e.g., system settings may be applied to the computer, and the user preferences may be applied, for example, so long as the user is logged-on to the cloud-based service.

FIG. 2A is a block diagram of a user interface, such as a control panel that may be used to input user preferences and/or system settings according to an example embodiment. In one implementation, a user interface, such as a control panel 200, may be provided as a web-based application, and can receive and store the system settings and user preferences in either a local file on the computer 110 or 120, or uploaded and stored in a cloud-based file on a remote web server provided on the cloud-based service (e.g., cloud-based server 126). Thus, in one example embodiment, the system settings and user preferences may be configured and/or or changed via the control panel 200, and these system settings and user preferences may be stored in a cloud-based file on a remote web server (e.g., cloud-based server 126).

As shown in FIG. 2A, in one implementation, control panel 200 may include a Network button 201, a Display button 202, a Sound button 203, a Power button 204, an Accounts button 205, a Security button 206, a Language button 207, a Keyboard button 208, a Mouse button 209, a Printer button 210, a Date and Time button 211 and an Updates button 212. The Network button 201 allows a user to setup a network connection and make configuration changes; the Display button 202 allows a user to select display settings such as screen resolution and color management preferences; the Sound button 203 allows a user to setup and configure audio input and output devices, including adjusting volume and equalization; the Power button 204 allows a user to control power management settings; the Accounts button 205 allows a user to setup and control accounts; the Security button 206 allows a user to setup and configure access rights and other security system settings such as firewalls, spam filters, and virus protection; the Language button 207 allows the user to configure the computer for regional language settings; the Keyboard button 208 allows the user to setup keyboard layouts and settings such as the functionality of control keys; the Mouse button 209 allows a user to setup mouse user preferences such as sensitivity and single/double click parameters; the Printer button 210 allows the user to setup and configure printers; the Date and Time button 211 allows the user to select time zones and change the date and time; and the Updates button 212 allows the user to configure auto update parameters such as the frequency with which auto updates are received or processed, or whether system reboots are done automatically or at scheduled times after an auto update is received. The buttons shown in FIG. 2A are but only example of a user interface tool through which the user can edit system settings and user preferences. Other user interface tools (e.g., drop down lists, slider bars, text input fields, etc.) can also be used.

Figure 2B:
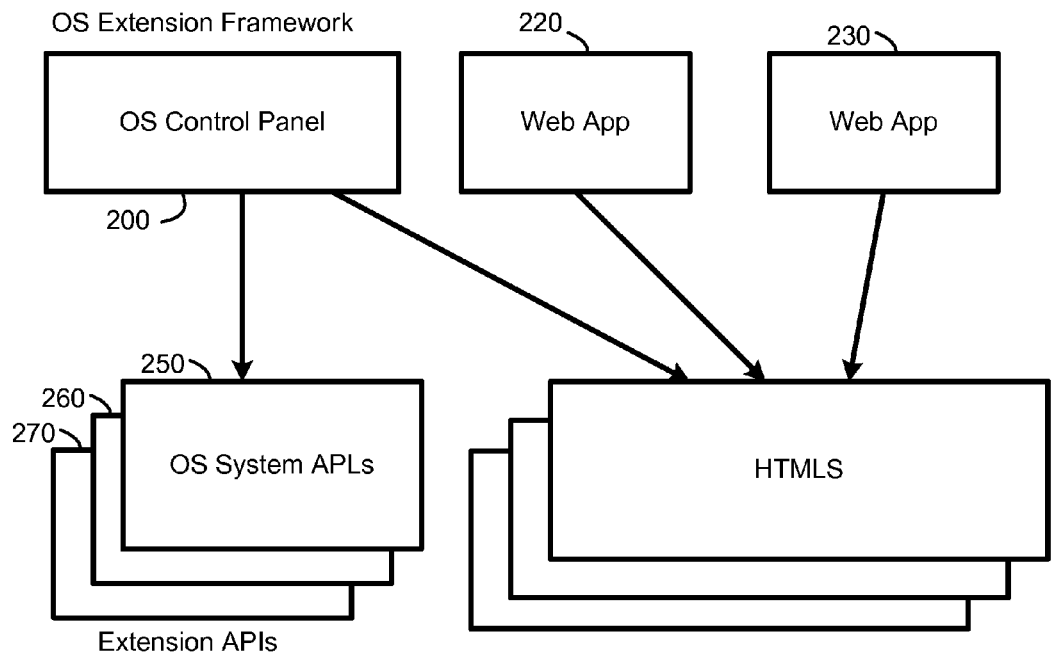
FIG. 2B is a schematic diagram showing an exemplary way a cloud-based control panel can access system level resources on a computer platform used for cloud based computing.

FIG. 2B is a schematic diagram showing an example way a cloud-based control panel can access system level resources on a computer used for (or configured for) cloud based computing. As shown in FIG. 2B, the Control Panel 200 shown in FIG. 2A can access and control system-level resources of a computer platform through a plurality of system-level APIs or Application Programming Interfaces 250, 260 and 270. API's 250-270 allow the Control Panel 200 to access various system-level resources of the computing platform such as networking and display settings as discussed above. In one implementation, Control Panel 200 is written as a web-based application, and may be written using Hyper Text Markup Language, version 5, or HTML5 and Javascript. The web-based applications that are run on and through the computer platform's browser, such as Web Apps 220 and 230, may be written in the same language.

In one implementation, Control Panel 200 is the only application that is granted access to the system-level API's 250-270. This minimizes, or at least may decrease, the chance that a malicious web-based application will gain access to the computer platform's system resources and settings. In this implementation, any web-based application wishing to change or access any system-level resource must do so by launching or prompting a user to launch the Control Panel 200 and manually make the desired changes, or by requesting the user to grant access to the needed system resources. In alternate implementations, one or more web applications may be automatically granted access to one or more system resources through API's 250-270. For example, if Web App 220 were a trusted media viewing application, it may be granted automatic access to a Display setting API in order to change the screen saver settings while a user is watching a streaming movie. This will prevent the screen saver from launching while the movie is playing. Once the video stream has ended, the media viewing application can reset the screen saver settings to their default values.

Figure 3:
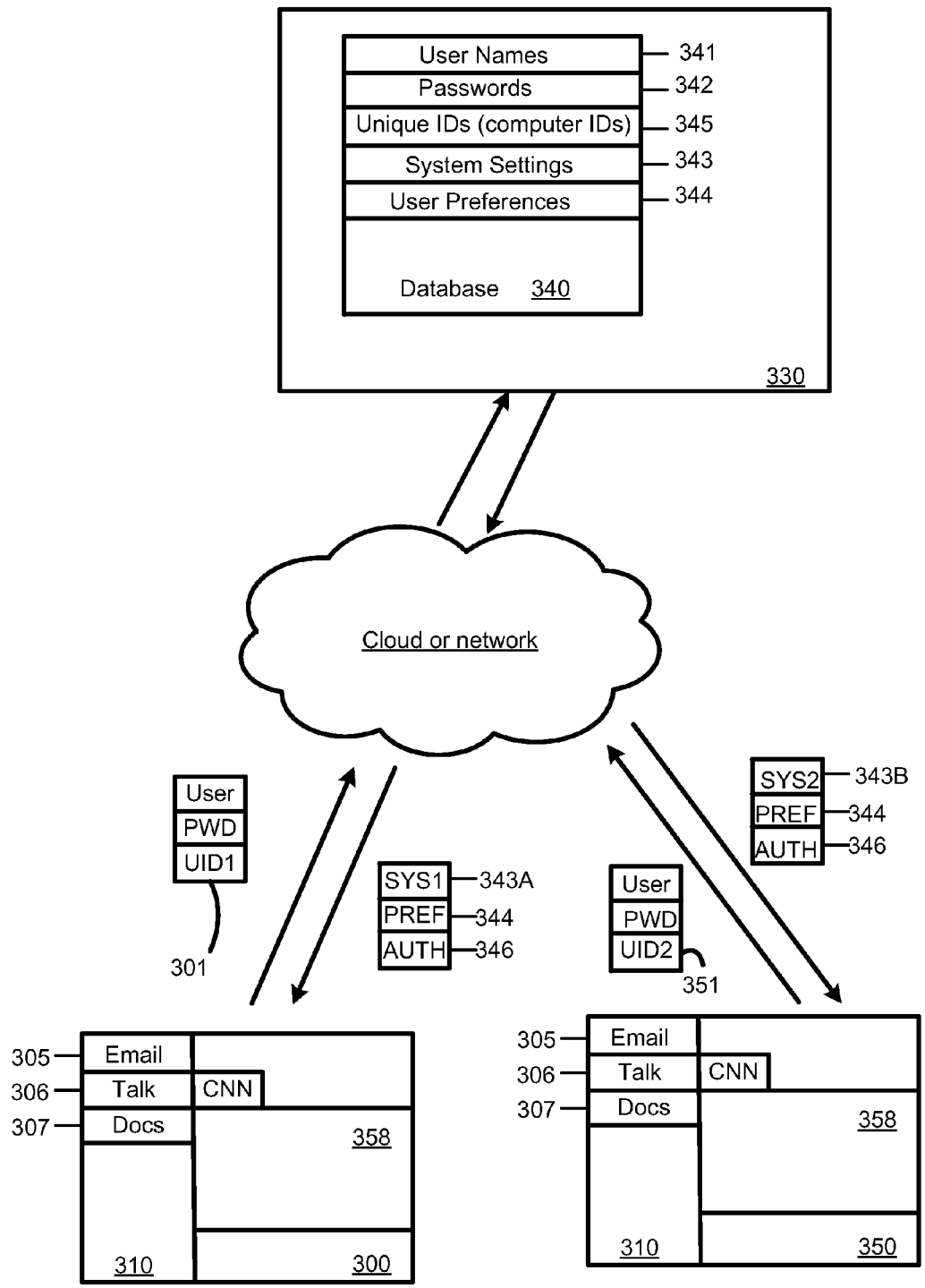
FIG. 3 is a schematic diagram of two computers 300 and 350 that may access a cloud-based server 330 offering a cloud-based service.

FIG. 3 is a schematic diagram of two computers 300 and 350 that may access a cloud-based server 330 offering a cloud-based service, and example information that may be exchanged between each computer and the cloud based server 330. As discussed above, in one implementation when a user supplies authorization credentials (or authentication information) to a computer 300 or 350, those credentials can be used to login or authenticate the user to one or more cloud-based services or accounts. As shown in FIG. 3, a user can log onto the cloud-based service via computer 300 that is owned by the user. If the computer 300 stores a user's system settings and preferences on the remote server 330, the computer 300 sends authentication information 301 to the server 330 to authenticate the user. In one implementation, the authentication information may includes a username, password, and a unique ID1 (or computer ID1) that is used to uniquely identify the computer 300. In one implementation, this authentication information may be encrypted prior to being sent to the remote server 330.

The remote server 330 can include a database 340 that stores information such as usernames 341, passwords 342, and user preferences 344 for a plurality of users/user accounts, and system settings 343 and unique IDs (or computer IDs) 345 for a plurality of computers. The remote server 330 can authenticate the information 301 that was sent to it by computer 300, e.g., in a two step process. First, the remote server 330 can determine whether the user has a valid account by looking for the username and password sent by computer 300 in the database 340. If the remote server cannot confirm that the user has a valid account, either because it cannot find the username in database 340 or because the password associated with a username in database 340 does not match the password sent by computer 300, it can send information to computer 300 either denying the user access to computer 300 or granting the user only limited access to computer 300 or remote server 330. If the user is granted only limited access to computer 300 or remote server 330, computer 300 may allow the user to only use certain default applications such as a web browser.

If, however, the remote server 330 confirms the authentication information 301 sent by computer 300, it then determines whether the user is accessing his or her account from the user's own computer 300 or from another computer 350. It can do this by comparing the unique ID (UID1) sent by computer 300 to the unique ID 345 that is associated with the user's account in database 340. If the two unique IDs match, the remote server 330 knows (or this indicates that) the user is accessing his or her account from his or her own computer 300 (or from a computer assigned to the username). The server may then send computer 300 the user's system settings (SYS1) 343A associated with UID1/computer 300, user preferences 344 associated with the user's account (or username), and one or more authorization tokens 346 that allow the user to automatically access one or more remote web services or accounts without having to separately log into those services or accounts. In one implementation, authorization tokens 346 may be provided in the form of cookies that are valid so long as the user is logged into computer 300. Upon receiving the system settings 343A (associated with UID1/computer 300), user preferences 344 (associated with the use account/username), and authorization tokens 346, computer 300 applies them. For example, computer 300 may apply user preferences 344 and authorization tokens 346 to launch and automatically log into various applications, such as, for example, Email 305 (an email application), Talk 306 (a chat application) and Docs 307 (a document or word processing application), and to load the web browser 308 with the CNN homepage. The system settings 343A may be applied to set one or more system settings for computer 300, e.g., printers, network connections, etc.

In FIG. 3, the Email 305, Talk (or chat) 306 and Docs (or word processing application) 307 applications are shown as a series of stacked panels. A panel may be a user information element having all the attributes of a browser tab, but that can be docked to the side of the display in a Panel Bar 310. Panels can contain applications, notifications, browser histories, and user generated content such as pop-up windows.

Referring again to FIG. 3, a user may instead log onto his or her user account via a computer 350 that is not owned by the user (or not assigned to or associated with the user account). As described above, the computer 350 sends authentication information 351 to the server 330 to authenticate the user, including a username, password, and a unique ID (or computer ID), UID2, that uniquely identifies computer 350. The remote server 330 will again try to authenticate the information 351 sent by computer 350 in a two step process, for example. First, the remote server 330 may determine whether the user has a valid account by looking for the username and password sent by computer 350 in the database 340. If the remote server 330 determines the user does not have a valid account, it can again send information to computer 350 either denying the user access to computer 350 or granting the user only limited access rights to computer 350 or remote server 330/cloud-based service. If, however, the remote server 330 is able to authenticate the information 351 sent by computer 350, it may, optionally, again determine whether the user is accessing his or her account from a computer 300 owned by the user or from another computer 350. Again, in one implementation, this may be done by comparing the unique ID (or computer ID), UID2, sent by the computer 350 to the unique ID 345 that is associated with the user's account in database 340. If the two unique ID's fail to match, the remote server 330 knows the user is accessing his or her account from a computer 350 that is not owned by the user. The remote server 330 may then send computer 350 the user's preferences 344 and one or more authorization tokens 346 that allow the user to automatically access one or more remote web services or accounts without having to separately log into those services or accounts. However, it will not send computer 350 the user's system settings 343 (that are assigned to the computer 300), which may only be applied to the computer 300 that is owned by the user. In other words, system settings 343 may be provided to a computer having a UID or computer ID associated with (or assigned to) the system settings. Upon receiving the user preferences 344 and authorization tokens 346, computer 350 applies them.

In an example embodiment, server 330 may also send computer 350 the system settings SYS2 assigned to or associated with the unique ID or computer ID (UID2) that identifies computer 350. Computer 350 may receive the system settings SYS2, and may apply the system settings SYS2 to such computer. Thus, in one example embodiment, at least in some cases, a user experience on a computer that is logged in to a cloud-based service may be provided by a combination of the user preferences for (or associated with) the user/user account and the system preferences for (or associated with) the computer from which the user has logged in to the cloud-based service, for example, regardless whether the user owns the computer or not. Thus, the user preferences may be consistent for the same for the user (or user account), regardless of the computer that is used to log in to the cloud-based service. On the other hand, according to an example embodiment, the system settings may change from computer to computer (even for the same user/user account), since, according to an example embodiment, there may be system settings provided for each computer (having a unique ID or computer ID).

As with computer 300, computer 350 may apply the user's preferences 344 and authorization tokens 346 to launch and automatically log into Email (an email application) 355, Talk (or chat application) 356 and Docs (or word processing application) 357 applications, and to load the web browser 358 with the CNN homepage. As shown in FIG. 3, by storing a user's preferences 344 in a cloud-based server 330 and downloading the user's preferences whenever a user logs onto a cloud-optimized computer platform 300 or 350, the look, feel and functionality of the user's computer experience may be nearly the same regardless of whether the user logs onto a computer 300 that is owned by the user or another computer 350 that is not owned by the user. There may be some differences in the functionality or features or operation of computers 300 and 350, and those differences may be due, at least in part, to the differences in the system settings of computer 300 (SYS1) and computer 350 (SYS2).

In one example embodiment, system settings may be downloaded to a computer only when the computer ID or UID is associated with the user account/username (e.g., computer owned or assigned to the user). Thus, in such an example embodiment, system settings (e.g., SYS1) are only downloaded to a computer 300 that is owned by the user (or downloaded to a computer having a UID associated with the user account/username) when the user logs into computer 300, and system settings (e.g., SYS2) are not downloaded to a computer 350 that is not owned by the user (or not downloaded to a computer having a UID not associated with the username/user account) when the user logs into computer 350. In such case, system settings stored locally on computer 350 may be used or applied to computer 350, for example. Differences in system settings 343 can be in the form of different network connections, different default printers, and different user account and access rights, as examples, or differences in other system settings for computers 300 and 350, for example.

In another example embodiment, after a user logs in to a cloud-based service using a computer, the computer used to log-in receives from the cloud-based service both user preferences associated with (or assigned to) the username/user account and the system settings (e.g., SYS1 for computer 300 and SYS2 for computer 350) associated with (or assigned to) the computer, regardless whether such computer is owned by or associated with the user, according to an example embodiment. In some embodiments, some computers may be "owned by" or "associated with" a single user, who may establish customized system settings for each such computer. For example, a user may frequently use multiple networked computers and designate a preferred printer for each of those computers. In some embodiments, each computer that a user logs into, and establishes user preferences or system settings for, may thereafter be designated a computer that the user "owns" or is "associated with."

According to an example embodiment, a computer may be pre-customized or pre-configured for a cloud-based service As discussed above, a computer configured (or optimized) for cloud-based computing/service may allow a user to enjoy a very similar look, feel and computing experience when logged onto the cloud-based service either via his own computer or via a third party computer, since at least the user preferences will be the same for the user, regardless of which computer is used to log-on to the cloud-based service. When a customer orders or purchases such a computer, he or she can pre-customize or pre-configure the computer for the cloud-based service, e.g., before he or she first uses it, or before the user receives the computer, or before the user first logs-on to the cloud-based service using the new computer.

In an example embodiment, a computer may be pre-customized through a web-based customization application, which may be downloaded from the cloud-based service. This customization application may be particularly useful, for example, for those users who switch from a non-cloud-based computing to a computer configured for cloud-based service (or configured for cloud-based computing), or for those purchasing or obtaining/ordering a new computer (either for themselves or someone else) and the user would like to pre-customize or pre-configure such computer, e.g., prior to using such computer to log in to the cloud-based service.

In one example embodiment, the pre-customization or pre-configuration of such computer may include, for example, using a customization application to: upload to the cloud-based service data files, media files, and/or other files that will be made available to the user/user account when the user logs on to the cloud-based service using the new computer; and system settings for the new computer (to be associated with the unique ID or computer ID for the new computer), and user preferences for the user account (and/or creating a new user account with the cloud-based service if not already created), where such user preferences and system settings for the new computer will be downloaded to and applied by the new computer when the user logs-on (e.g., first logs-on) to the cloud-based service using the new computer.

Figure 4:
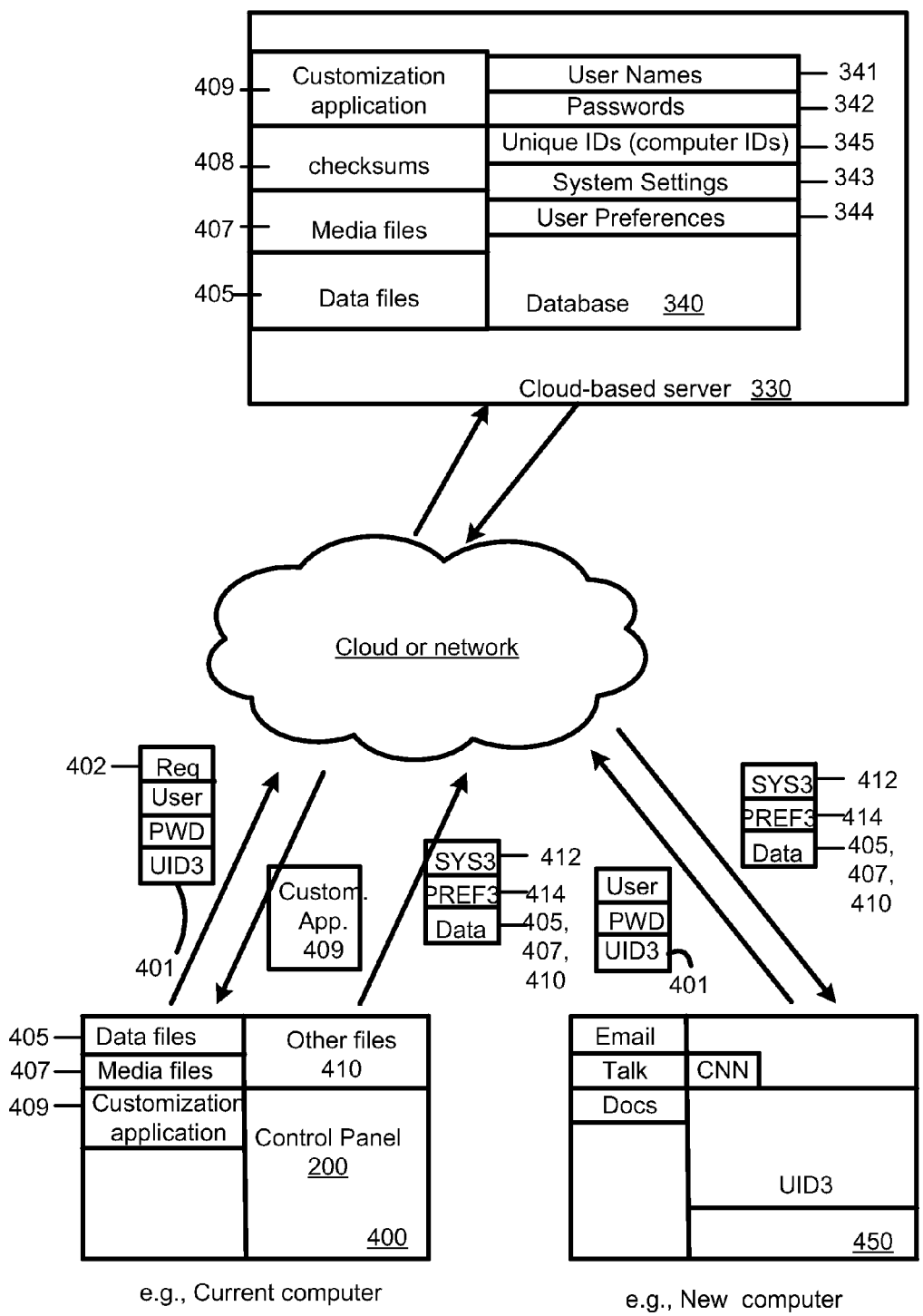
FIG. 4 is a block diagram illustrating an example of pre-customizing a computer (and/or user account) for cloud-based service.

FIG. 4 is a block diagram illustrating an example of pre-customizing a computer (and/or user account) for cloud-based service. A cloud-based server 330 may store a customization application 409, and may also store information or data to be made available to each user account, e.g., data files 405, media files, and other files. Some types of non-personal files, e.g., movies, audio files or music files, and the like, may be stored in the server (or other server) once, and an identifier 408 such as a hash value or checksum may be stored for each user that stores such file, to identify such non-personal file. This may allow a more efficient storage of this file for multiple users, rather than storing multiple copies of the same file. For example, using the identifier or checksum, the non-personal file may be stored on the cloud-based server once, and allow each user to access such file, e.g., based on an identifier or checksum stored for each user that identifies or is associated with such file.

A computer 400 is shown, and may include data files 405, media files 407 and other files 410 stored locally thereon (e.g., stored on a local hard disk drive). In an example embodiment, a new (either new or at least new for this user) computer 450 may be obtained, ordered or purchased, and the computer 450 may be pre-customized or pre-configured for a cloud-based service before use, e.g., before the computer 450 is delivered, or before a user first logs-on to the cloud-based service using the computer 450, etc. The pre-customization or pre-configuring of the computer 450 may occur as a step during the purchase or ordering of the computer 450, or may occur after the purchase or ordering of the computer, or may occur at another time, as examples. The pre-customization or pre-configuring of the computer 450 may include providing the user with access to data files 405, media files 407 and other files 410. The web-based customization application 409 may include a data upload application that will identify and store on cloud-based server 330 any data files 405, media files 407 and/or other files 410 that are currently stored on the hard drive of the user's current computer 400. These files may be made available to the user when the user logs in to the cloud-based service via his/her new computer 450, for example. The customization application 409 may identify files stored on user's current computer 400 that are also stored on the cloud-based server 330, e.g., to avoid storing duplicate copies of such files on server 330. For each file (whether uploaded or already stored on server 330) that will be made available to the user, server 330 may store a pointer to the storage location of the file in a database containing information about the user's accounts and privileges.

Figure 5:
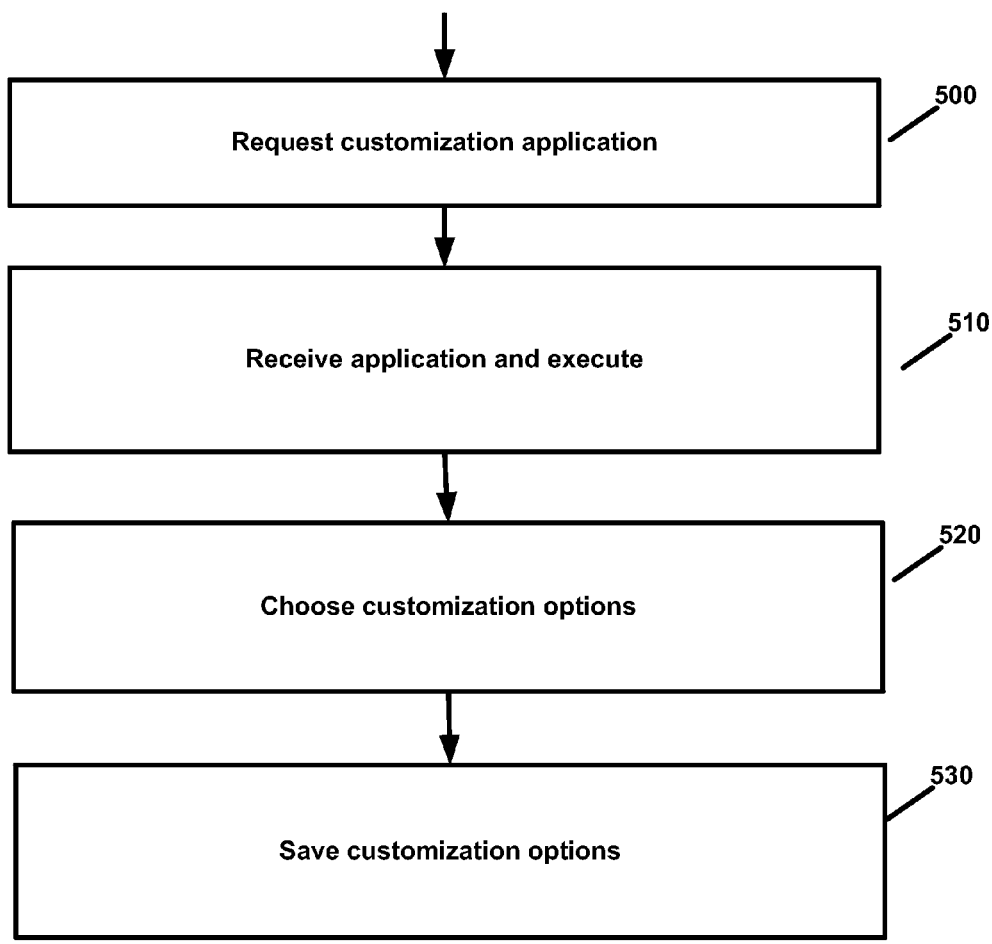
FIG. 5 is a flow chart disclosing a method for pre-customizing a computer for cloud-based computing/service.

FIG. 5 is a flow chart disclosing a method for pre-customizing a computer for cloud-based computing/service. As shown in FIG. 5, the user can begin the process of customizing a (new) computer 450 by requesting a web-based customization application 409 from a web server, e.g., by submitting a request 402 from a current computer 400 to a cloud-based server 330 for the web-based customization application 409. The request may include, for example, the unique ID/computer ID for the new computer 450, which is UID3. Although not required, the request may include a username and password of the user whom is requesting the customization application, and may also include a username and password (if created yet) for the user of the new computer 450. Alternatively, the username and password of the user of the new computer 450 may be provided to the server 330 when the system settings and user preferences are uploaded to the server 330 as described below. The request 402 can be made (or sent to server 330), for example, anytime after the user has purchased his or her computer, and has access to information about the computer such as the unique ID or computer ID, shown as UID3 for the new computer 450.

The user's web browser on computer 400 may receive and run the customization application 409 (500). If the user of the new computer 450 does not already have an account with the cloud-based service, an account with the cloud-based service may be established, and a username and password may be assigned to the user. If the user of the new computer 450 already has an account with the cloud-based service, then the user's existing username and password may be used. Thereafter, the user can be prompted to choose (520) and store (530) customization options for his or her new computer 450 and/or for the user's user account. Such customization options can include the various system settings for the new computer (e.g., system settings associated with or assigned to computer 450/UID3) and the user preferences associated with the user account, which may then be stored in database 340 of cloud-based server 330. The customization options may, for example, be selected through the customization application 409, which may include a user interface, such as a web-based control panel 200 as shown in FIG. 2.

As shown in FIG. 4, the computer 400 may receive the customization application 409. As discussed, customization options, which may include user preferences (PREF3) 414 for the user account and/or system settings (SYS3) 412 for computer 450, may then be input via control panel 200 (for example) and uploaded to cloud-based server 330. Also, the unique ID or computer ID (UID3), and the username/password for the user of computer 450 may also be uploaded or transmitted to the server 330, e.g., so that the cloud-based server 330 may associate or assign the user preferences (PREF3) to the user account and associate or assign the system settings (SYS3) to the UID3 (computer ID or unique ID for computer 450). As described in greater detail below, data and/or files (e.g., data files 405, media files 407 and possibly other files 410) may also be uploaded from computer 400 to cloud-based server 330 so that such files and data may be available to the new computer 450 when it logs-in to the cloud-based service, as described in greater detail below.

In addition to using a web-based application or control panel 200 to choose (select) and store customization options (e.g., system settings and/or user preferences), the customization application 409 may include a web-based data upload application that will identify and store on a cloud-based server 330 any data files 405, media files 407 (e.g., audio/music files, video files and pictures) or other files 410 (e.g., such as contacts list, bookmarks or Web favorites) or user documents that are currently stored on the hard drive of the user's current computer 400. These may be identified by the upload program of the customization application 409, so that such files may be made available to the user when the user logs in to the cloud-based service via his/her new computer 450.

For example, the web-based data upload application can scan the hard-drive of the user's current computer 400 for games, music, videos, photos and other media content, and for any Word, PowerPoint, Excel spreadsheets or other user generated documents that the user has stored on his or her current computer. After identifying any media content and/or documents stored on the hard drive of the user's current computer, the web-based application may automatically upload such files, data and content to server 330, or may prompt the user to upload those files to server 330, so they can be immediately accessed from the user's new cloud-based computer 450, e.g., the first time the user logs onto the cloud-based service, for example In one implementation, the web application may compute a checksum (or other file identifier, such as a hash of such file) of any file the user wishes to upload to server 330 and send the checksum to server 330 before it uploads the file. Server 330 will then search a storage database 340 for a file having the same checksum to determine if it already stores a copy of the file, e.g., an mp3 version of a popular song. According to an example embodiment, a hash, checksum or other identifier may be calculated and uploaded to server 330 for general or non-personal files, e.g., movies, songs, etc., to determine if such files are already stored on the server. If the server 330 determines it already stores a copy of the file, the server can simply store a pointer to that copy in a database containing information about the user's accounts and privileges. The server 330 can then notify the user that he or she has been granted access to the copy of the file stored on the server 330, so that the user does not have to upload the file from his or her current computer 400. If the server 330 is not currently storing a copy of the file the user wishes to upload, the server will ask the user to upload the file. When the file is uploaded, the server 330 will store it, and again place a pointer to the storage location of the file in the database containing information about the user's accounts and privileges.

After the user orders (e.g., purchases) and receives the new computer 450, the user may then log on to the cloud-based service for the first time using the new computer 450, e.g., by transmitting his authentication information 401, including, for example, his username and password, as well as the unique ID or computer ID (UID3) for computer 450. After being authenticated by server 330, the server 330 may send computer 450 the system settings (SYS3) 412 for computer 450 (system settings assigned to UID3), and the user preferences (PREF3) 414 for the user account. The server may also transmit to computer 450, or at least make available to computer 450, the data files 40, media files 407, and other files 410 (which were uploaded from computer 400), for example, as shown in FIG. 4. A user may then access and use (e.g., via his or her new computer), the system settings, user preferences and data files and media files that were previously uploaded and stored by the server or cloud-based service.

Therefore, a user may purchase or obtain a computer, and may pre-customize the computer. Such pre-customization may include, for example, configuring system settings for the new computer and user preferences for the user account, and uploading files to be made available to the new computer when the user logs on to the cloud-based service the first time using the new computer 450.

Figure 6:
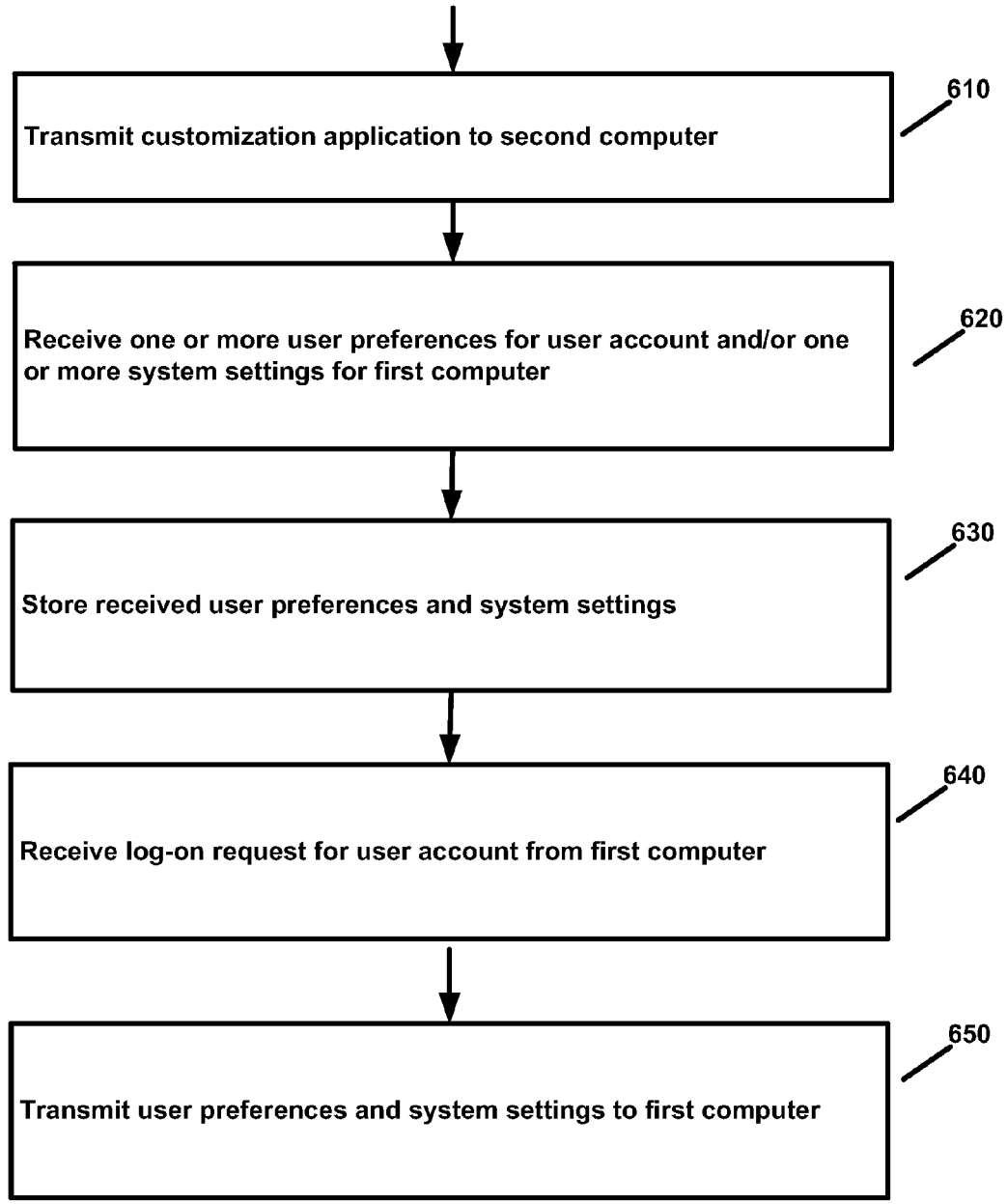
FIG. 6 is a flow chart illustrating pre-customizing a computer (e.g., computer 450) according to an example embodiment.

FIG. 6 is a flow chart illustrating pre-customizing a computer (e.g., computer 450) according to an example embodiment. A customization application may be transmitted from a server to a second computer (610). Such a customization application may allow, for example, for the pre-customization of a first (or different) computer. The customization application may include a user interface, such as a control panel 200 (as an example) to allow the selection of various customization options, such as user preferences and system settings. In an example embodiment, the system settings may be settings associated with the first computer and specific to the user account. That is, two different users of the first computer may have different system settings. The user preferences and system settings, along with a username for a user account and/or a computer ID (identifying the first computer) may be transmitted or sent from the second computer and received by the server (620). User data files may also be uploaded and stored on the server (or a cloud-based server) for the user account. The server (or other server) may store the received user preferences and system settings, and may associate these preferences and settings with the user account/username (630).

Referring to FIG. 6, a log-on request may be received by the server from the first computer (640). The log-on request may include the username for the user account, and may also include a password and the computer ID of the first computer. The server may then authenticate the user log-on information (e.g., username and password), and may then transmit the user preferences for the user account and the system settings (e.g., user-specific system settings for the first computer) to the first computer (650). The first computer may then apply the received user preferences for the user account and may apply the system settings to the first computer while the user is logged on to the cloud-based service. User files, which may have been previously uploaded to the server for the user account, may also be made available to (or sent to) the user of the first computer.

Figure 7:
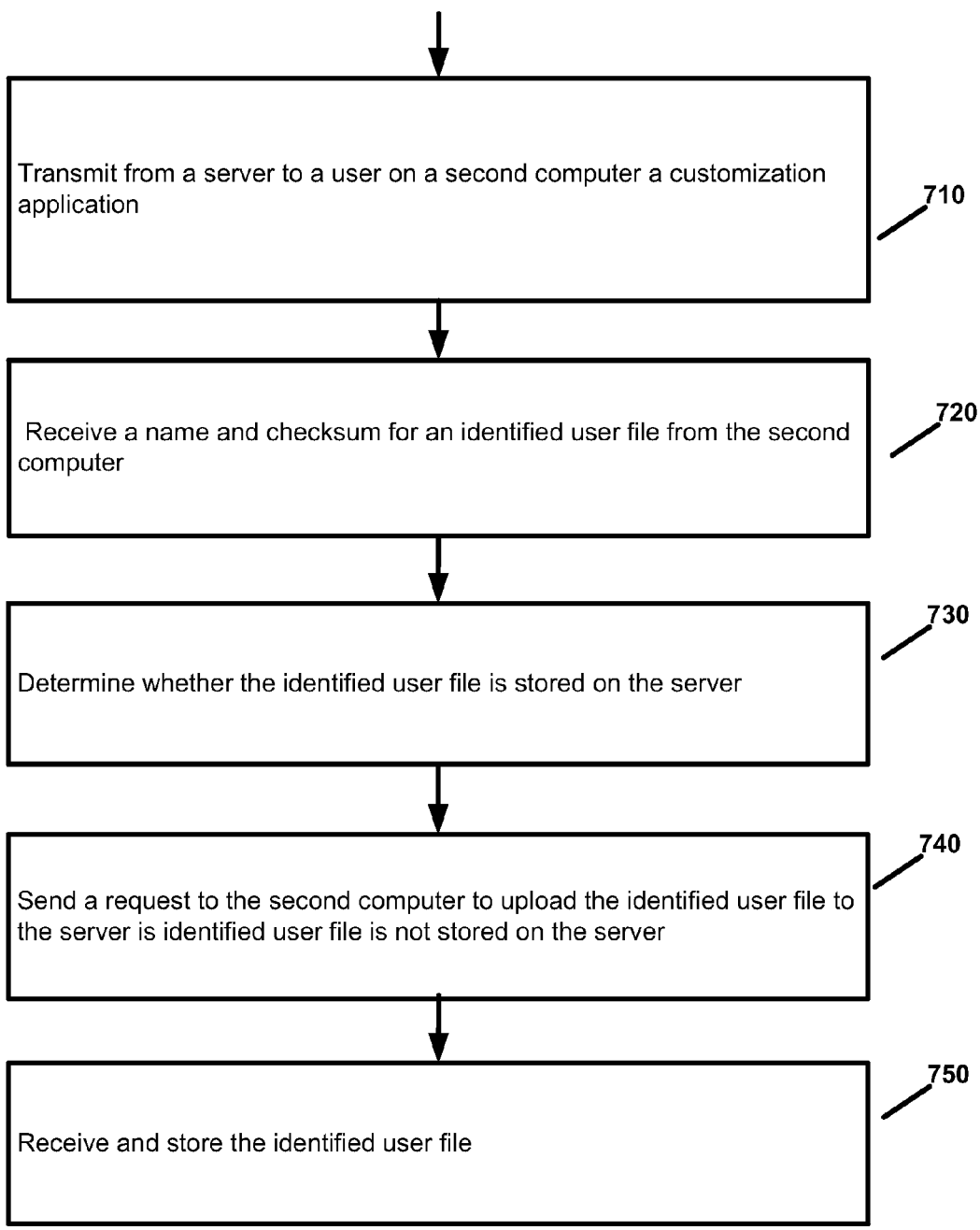
FIG. 7 is a flow chart illustrating a method of pre-customizing a computer according to an example embodiment.

FIG. 7 is a flow chart illustrating a method for pre-customizing a first computer according to an example embodiment. A customization application may be sent or transmitted from a server to a second computer (710). In an example embodiment, when installed and running on the second computer, at least a portion of the customization application may identify a user file on the second computer to be made available to the user when the user logs (e.g., first logs) onto a cloud-based service via the first computer. For example, the portion of the customization application may compute a checksum (or other identifier) for one or more user data files stored on the second computer. The checksum or identifier for each file may be transmitted from the second computer and received by the server (720).

With reference to FIG. 7, the server may determine whether each file is currently stored on the server (or stored on one or more servers associated with the cloud-based service) (730). For example, the server may compare the received checksum(s) to one or more checksums of files already stored on the server or cloud-based service. If a match is found, this may indicate that the identified file is currently stored on the server/cloud-based service, and it may be unnecessary to store another copy of such file. If the file is already stored on the server/cloud-based service, the server may send a reply to the second computer indicating that the file is already stored on the server/cloud-based service. There is no need for the second computer to upload the file to the server where such file is already stored on the server/cloud-based service. If a match is not found (the identified file is not currently stored on the server/cloud-based service), the server may send a request to the second computer to upload/send the identified user file to the server (740). The server may receive and store the user file in a server within the cloud-based service (750), and this file may be made available to the user account. In one example embodiment, the server may store a name of a file, a received checksum/identifier, and location information that identifies the location of the file.

Figure 8:
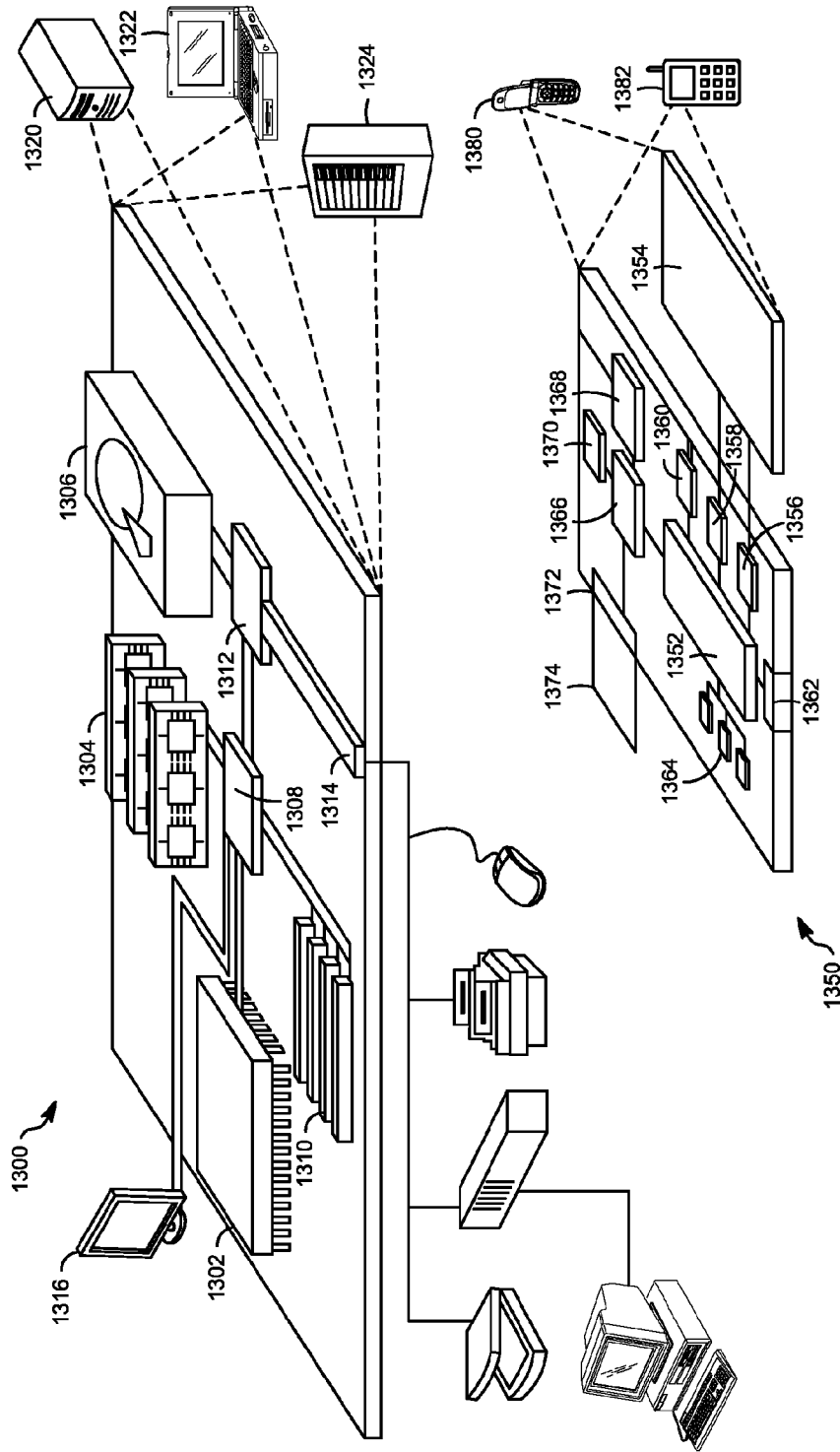
FIG. 8 is an illustration of a computer system in which the disclosed methods and apparatus can be embodied.

FIG. 8 is a block diagram showing example or representative structure, devices and associated elements that may be used to implement described the computing devices and systems described herein, such as computers or servers. The computing device 1300 may include computers, servers, or any other computing device. FIG. 8 shows an example of a generic computing device (or computer or server) 1300 and a generic mobile computing device 1350 (another example of a computer), which may be used with the techniques described here. Computing device (or computer) 1300 is intended to represent various forms of digital computers, such as laptops, desktops, workstations, personal digital assistants, servers, blade servers, mainframes, and other appropriate computers. Computing device 1350 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1300 includes a processor 1302, memory 1304, a storage device 1306, a high-speed interface 1308 connecting to memory 1304 and high-speed expansion ports 1310, and a low speed interface 1312 connecting to low speed bus 1314 and storage device 1306. Each of the components 1302, 1304, 1306, 1308, 1310, and 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as display 1316 coupled to high speed interface 1308. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1304 stores information within the computing device 1300. In one implementation, the memory 1304 is a volatile memory unit or units. In another implementation, the memory 1304 is a non-volatile memory unit or units. The memory 1304 may also be another form of computer-readable medium, such as a magnetic or optical disk.

The storage device 1306 is capable of providing mass storage for the computing device 1300. In one implementation, the storage device 1306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1304, the storage device 1306, or memory on processor 1302.

The high speed controller 1308 manages bandwidth-intensive operations for the computing device 1300, while the low speed controller 1312 manages lower bandwidth-intensive operations. Such allocation of functions is exemplary only. In one implementation, the high-speed controller 1308 is coupled to memory 1304, display 1316 (e.g., through a graphics processor or accelerator), and to high-speed expansion ports 1310, which may accept various expansion cards (not shown). In the implementation, low-speed controller 1312 is coupled to storage device 1306 and low-speed expansion port 1314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. It may also be implemented as part of a rack server system 1324. In addition, it may be implemented in a personal computer such as a laptop computer 1322. Alternatively, components from computing device 1300 may be combined with other components in a mobile device (not shown), such as device 1350. Each of such devices may contain one or more of computing device 1300, 1350, and an entire system may be made up of multiple computing devices 1300, 1350 communicating with each other.

Computing device 1350 includes a processor 1352, memory 1364, and an input/output device such as a display 1354, a communication interface 1366, and a transceiver 1368, among other components. The device 1350 may also be provided with a storage device, such as a microdrive or other device, to provide additional storage. Each of the components 1350, 1352, 1364, 1354, 1366, and 1368, are interconnected using various buses, and several of the components may be mounted on a common motherboard or in other manners as appropriate.

The processor 1352 can execute instructions within the computing device 1350, including instructions stored in the memory 1364. The processor may be implemented as a chipset of chips that include separate and multiple analog and digital processors. The processor may provide, for example, for coordination of the other components of the device 1350, such as control of user interfaces, applications run by device 1350, and wireless communication by device 1350.

Processor 1352 may communicate with a user through control interface 1358 and display interface 1356 coupled to a display 1354. The display (or screen) 1354 may be, for example, a TFT LCD (Thin-Film-Transistor Liquid Crystal Display) or an OLED (Organic Light Emitting Diode) display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may be provide in communication with processor 1352, so as to enable near area communication of device 1350 with other devices. External interface 1362 may provide, for example, for wired communication in some implementations, or for wireless communication in other implementations, and multiple interfaces may also be used.

The memory 1364 stores information within the computing device 1350. The memory 1364 can be implemented as one or more of a computer-readable medium or media, a volatile memory unit or units, or a non-volatile memory unit or units. Expansion memory 1374 may also be provided and connected to device 1350 through expansion interface 1372, which may include, for example, a SIMM (Single In Line Memory Module) card interface. Such expansion memory 1374 may provide extra storage space for device 1350, or may also store applications or other information for device 1350. Specifically, expansion memory 1374 may include instructions to carry out or supplement the processes described above, and may include secure information also. Thus, for example, expansion memory 1374 may be provide as a security module for device 1350, and may be programmed with instructions that permit secure use of device 1350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1364, expansion memory 1374, or memory on processor 1352, that may be received, for example, over transceiver 1368 or external interface 1362.

Device 1350 may communicate wirelessly through communication interface 1366, which may include digital signal processing circuitry where necessary. Communication interface 1366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1368. In addition, short-range communication may occur, such as using a Bluetooth, WiFi, or other such transceiver (not shown). In addition, GPS (Global Positioning system) receiver module 1370 may provide additional navigation- and location-related wireless data to device 1350, which may be used as appropriate by applications running on device 1350.

Device 1350 may also communicate audibly using audio codec 1360, which may receive spoken information from a user and convert it to usable digital information. Audio codec 1360 may likewise generate audible sound for a user, such as through a speaker, e.g., in a handset of device 1350. Such sound may include sound from voice telephone calls, may include recorded sound (e.g., voice messages, music files, etc.) and may also include sound generated by applications operating on device 1350.

The computing device 1350 may be implemented in a number of different forms, as shown in the figure. For example, it may be implemented as a cellular telephone 1380. It may also be implemented as part of a smart phone 1382, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

A number of embodiments have been described above. Nevertheless, it will be understood that various modifications may be made without departing from the spirit and scope of the invention. For example, the logic flows depicted in the figures do not necessarily require the particular order shown, or sequential order, to achieve desirable results. In addition, other steps may be provided or eliminated from the described flows, and other components may be added to or removed from the described systems, without departing from the scope of the invention. Accordingly, other embodiments are within the scope of the following claims.

What is claimed is:

1. A non-transitory computer-readable storage medium having executable-instructions stored thereon, the instructions being executable to cause a server computer to:

transmit to a second computer a customization application to establish, on a first computer having a unique first computer ID, one or more user preferences for an account of a user of a network-based service for use when the account is accessed by the user via the first computer and one or more local system settings for the first computer, wherein the network-based service is remotely-provided to the second computer;

receive from the second computer the one or more user preferences, the one or more local system settings for the first computer, a username for the user account, and a unique second computer ID that identifies the second computer;

store the received one or more user preferences, the one or more local system settings for the first computer, the username for the user account, and the unique second computer ID that identifies the second computer;

receive a log-on request from the first computer, the log-on request including the username for the user account and a computer ID that is either the unique second computer ID that identifies the second computer or the unique first computer ID that identifies the first computer;

compare the computer ID received with the log-on request from the first computer to the unique second computer ID stored with the user preferences and the one or more local system settings for the first computer;

if the computer ID received with the log-on request from the first computer matches the unique second computer ID stored with the one or more user preferences and the one or more local system settings for the first computer, transmit the stored one or more user preferences and the one or more local system settings for the first computer to the first computer; and if the computer ID received with the log-on request is the unique first computer ID, transmit the stored one or more user preferences but not the stored one or more local system settings for the first computer to the first computer.

2. The non-transitory computer-readable storage medium of claim 1 wherein the instructions are further executable to cause the server computer to:

receive by the server computer from the second computer one or more user files to be made available to the user of the first computer when the user logs on to the network-based service using the first computer; and make the one or more received user files available to the user of the first computer via the network-based service after the username for the user account has been authenticated.

3. The non-transitory computer-readable storage medium of claim 1 wherein the instructions are further executable to cause the server computer to:

provide, by the server computer to the second computer, a confirmation of an online purchase or order of the first computer; and receive by the server from the second computer one or more user files to be made available to the user when the user logs-on to the network-based service using the first computer.

4. The non-transitory computer-readable storage medium of claim 1, wherein:

the receiving the log-on request includes receiving the log-on request from the first computer, the log-on request including the username for the user account and the unique first computer ID that identifies the first computer; and the transmitting the stored user preferences includes transmitting, to the first computer, the stored user preferences but not the stored system settings based on the computer ID received with the log-on request not matching the unique second computer ID that identifies the second computer and is stored with the user preferences and system settings.

5. The non-transitory computer-readable storage medium of claim 1, wherein the system settings include a printer preference and the user preferences include a web browser bookmark.

6. The non-transitory computer-readable storage medium of claim 1, wherein the system settings include a display setting and the user preferences include a web browser bookmark.

7. A method comprising:

transmitting from a server computer to a second computer a customization application to establish, on a first computer having a unique first computer ID, one or more user preferences for an account of a user of a network-based service for use when the account is accessed by the user via the first computer and one or more local system settings for the first computer, wherein the network-based service is remotely-provided to the second computer;

receiving by the server computer from the second computer the one or more user preferences, the one or more local system settings, a username for the user account, and a unique second computer ID that identifies the second computer;

storing by the server computer the received one or more user preferences, the one or more local system settings for the first computer, the user name for the user account, and the unique second computer ID that identifies the second computer;

receiving a log-on request from the first computer, the log-on request including the username for the user account and a computer ID that either is the unique second computer ID that identifies the second computer or the unique first computer ID that identifies the first computer;

comparing the computer ID received with the log-on request to the unique second computer ID stored with the user preferences and the one or more local system settings for the first computer;

if the computer ID received with the log-on request from the first computer matches the unique second computer ID stored by the server computer with the one or more user preferences and the one or more local system settings for the first computer, transmitting the stored one or more user preferences and the one or more local system settings for the first computer from the server computer to the first computer; and if the computer ID received with the log-on request from the first computer is the unique first computer ID, transmitting the stored one or more user preferences but not the stored one or more local system settings for the first computer from the server computer to the first computer.

8. The method of claim 7 and further comprising:

receiving by the server computer from the second computer one or more user files to be made available to the user of the first computer when the user logs on to the network-based service using the first computer; and making the one or more received user files available to the user of the first computer via the network-based service after the username for the user account has been authenticated.

9. The method of claim 7 and further comprising:

providing, by the server computer to a second computer, a confirmation of an online purchase or order of the first computer; and receiving by the server computer from the second computer one or more user files to be made available to the user when the user logs-on to the network-based service using the first computer.

10. The method of claim 7, wherein:

the receiving the log-on request includes receiving the log-on request from the first computer, the log-on request including the username for the user account and the unique first computer ID that identifies the first computer; and the transmitting the stored one or more user preferences includes transmitting, to the first computer, the stored one or more user preferences but not the stored one or more local system settings based on the computer ID received with the log-on request not matching the unique second computer ID that identifies the second computer and is stored with the one or more user preferences and the one or more local system settings for the first computer.

11. The method of claim 7, wherein the system settings include a printer preference and the user preferences include a web browser bookmark.

12. The method of claim 7, wherein the system settings include a display setting and the user preferences include a web browser bookmark.

13. A hardware-based server computer comprising:

at least one processor; and at least one memory including computer program code, the at least one memory and the computer program code configured to, with the at least one processor cause the server computer to:

receive from a second computer one or more user preferences, one or more local system settings for a first computer having a unique first computer ID, a username for a user account, and a unique second computer ID that identifies the second computer;

store the received user preferences, the one or more local system settings for the first computer, the username for the user account, and the unique second computer ID that identifies the second computer;

receive a log-on request from the first computer, the log-on request including the username for the user account and a computer ID that is either the unique second computer ID that identifies the second computer or the unique first computer ID that identifies the first computer;

compare the computer ID received with the log-on request to the unique second computer ID stored with the user preferences and the one or more local system settings for the first computer;

if the computer ID received with the log-on request matches the unique second computer ID stored with the user preferences and the one or more local system settings for the first computer, transmit the stored one or more user preferences and the one or more local system settings for the first computer from the server computer to the first computer; and if the unique ID received with the log-on request is the unique first computer ID, transmit the stored one or more user preferences but not the stored one or more local system settings for the first computer from the server computer to the first computer.

14. The server computer of claim 13 wherein the at least one memory and the computer program code are further configured to, with the at least one processor cause the server computer to:

receive by the server computer from the second computer one or more user files to be made available to the user of the first computer when the user logs on to the server computer using the first computer; and make the one or more received user files available to the user of the first computer after the username for the user account has been authenticated.

15. The hardware-based server computer of claim 13, wherein:

the receiving the log-on request includes receiving the log-on request from the first computer, the log-on request including the username for the user account and the unique first computer ID that identifies the first computer; and the transmitting the stored one or more user preferences includes transmitting, to the first computer, the stored one or more user preferences but not the stored one or more local system settings based on the computer ID received with the log-on request not matching the unique second computer ID that identifies the second computer and is stored with the one or more user preferences and the one or more local system settings for the first computer.

16. The hardware-based server computer of claim 13, wherein the system settings include a printer preference and the user preferences include a web browser bookmark.

17. The hardware-based server computer of claim 13, wherein the system settings include a display setting and the user preferences include a web browser bookmark.

* * * * *